Figure 1:
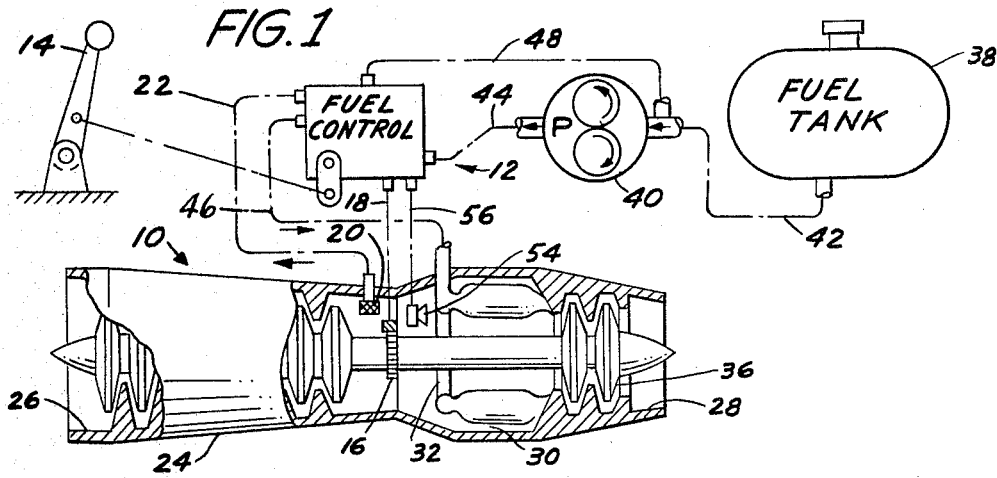

INVENTOR.
RALPH K. LONDAL
BY Walter Patoroka, Jr.
ATTORNEY

United States Patent Office 3,263,421
Patented August 2, 1966

3,263,421
FUEL CONTROL SYSTEM FOR IGNITER AND MAIN BURNER OF GAS TURBINE ENGINE
Ralph K. Londal, Detroit, Mich., assignor to Holley Carburetor Company, Warren, Mich., a corporation of Michigan
Filed Dec. 18, 1963, Ser. No. 331,603
6 Claims. (Cl. 60—39.14)

This invention relates generally to gas turbine engines, and more particularly to means for automatically cutting off the supply of igniter fuel at some predetermined percentage of maximum engine speed and for preventing the flow of fuel to the igniter during engine shut down.

As is well known in the art, gas turbine engines must be started by cranking so as to cause the compressor to supply combustion air to the main burner chamber. At some time during cranking, fuel must be supplied to the burners and the ignition system must be actuated to ignite the fuel-air mixture, after which the engine becomes self-sustaining. To insure proper starting, most engines include a separate igniter fuel system which, in conjunction with the ignition system, produces a more easily controlled smaller flame that in turn ignites the main burners.

In some engines, fuel supplied by the main fuel control may remain in the burner section from the previous run, and it may be desirable to exhaust this remaining fuel from the engine before restarting so as to avoid an explosion. Also, it is usually desirable to delay the supply of igniter and main fuel until cranking speed has reached some predetermined percentage of maximum engine speed so that sufficient combustion air is being supplied to provide a proper starting fuel-air mixture. Thus, in starting most gas turbine engines, some predetermined cranking speed is attained before the igniter fuel is supplied and the ignition system is actuated.

In gas turbine engines having a slower starting time, supplying igniter fuel and actuation of the ignition system can be accomplished manually by the pilot or operator; however, where the starting time is relatively short, manual control is difficult or impossible, and an automatic system is preferable.

For many engines, it is desirable to cut off the igniter fuel after the engine has started and has reached some predetermined percentage of maximum engine speed, say 40%, and to prevent its being supplied to the igniter when the engine is shut down. In the past, various time delay mechanisms have been employed in conjunction with the igniter valve in an attempt to accomplish this result; however, these prior designs have been found to be extremely difficult to calibrate and very erratic in their operation, sometimes preventing immediate restarting by retaining the igniter valve closed for a period of time after the engine has stopped running.

Accordingly, a general object of the invention is to provide an improved igniter fuel supply means which eliminates the above objections by utilizing control pressures rather than time delay mechanisms.

A further object of the invention is to provide such a means wherein there is no delay in restarting after "shut-down," thus preventing the possibility of wearing out a battery during any immediate restarting operation. In other words, an igniter fuel valve embodying the invention will positively reopen during engine "shut-down" when engine speed drops to some predetermined percentage of maximum engine speed, 10% for example.

A more specific object of the invention is to provide (1) a restricted continual communication between a speed-indicative pressure and a pressure responsive means which actuates an igniter valve and (2) a check valve for use in conjunction with the pressure responsive means for bleeding off the speed-indicative pressure during predetermined percentages of maximum speed, thereby accurately controlling the flow of fluid past the igniter valve.

Figure 2:
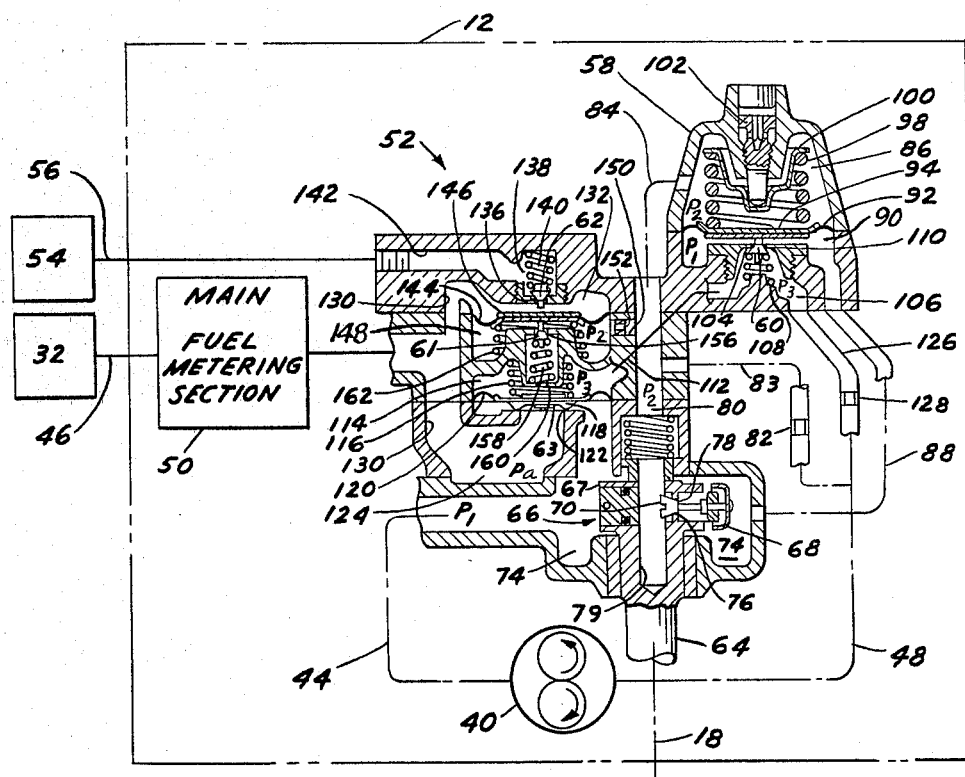

Other more specific objects and advantages of the invention will become apparent when reference is made to the following description and the accompanying illustrations wherein:

FIGURE 1 is a schematic illustration of a gas turbine engine having connected thereto fuel supply and fuel control systems, including an igniter fuel system embodying the invention; and, FIGURE 2 is an enlarged schematic illustration of the igniter fuel control portion of FIGURE 1.

Referring now to the drawings in greater detail, FIGURE 1 illustrates schematically a gas turbine engine 10 having a typical main fuel control 12 responsive to manual control by means of a selector lever 14, to engine speed by means of a gear box 16 and transmission line 18, and to other parameters such as compressor discharge pressure, for example, via a pressure probe 20 and a conduit 22.

A typical gas turbine engine 10 includes an outer housing 24 with an intake 26 and exhaust nozzle 28. A main combustion chamber 30 having a fuel distribution ring 32 therein is located within the housing 24 between the compressor 34 and the turbine 36. The fuel supply system generally comprises a fuel tank 38, an engine driven pump 40 that may be included as a component of the main fuel control 12, and supply conduits 42 and 44 for delivering fuel to the fuel control 12. As is well known in the art, the fuel control 12 meters the correct fuel flow for the particular engine operating requirements, as dictated by the above mentioned parameters. Correctly metered fuel is transferred to the fuel distribution ring 32 in the burner chamber via a conduit 46, any excess fuel being by-passed back to the inlet side of the pump via a return conduit 48.

As seen in FIGURE 2, in addition to the main fuel metering section 50, the fuel control 12 further includes means 52 for furnishing fuel to the igniter 54 of the engine 10 via a conduit 56, at engine speeds preselected for a particular engine. For example, in a particular engine, it may be desired to supply igniter fuel when cranking speed reaches 10% of maximum speed and to cut off this fuel when the engine has started and is operating at 40% of maximum speed.

More specifically, the means 52 for furnishing igniter fuel comprises a housing 58 containing a servo valve 60, a check valve 61, an igniter valve 62, a slave valve 63 and a shaft 64 journalled for rotation in the housing. It is to be understood that, while the means 52 is illustrated and described herein as being an integral part of a main fuel control 12 enclosed by the dot-dash line of FIGURE 2, such a means 52 may alternatively be added to the fuel supply system by properly connecting the same either upstream or downstream of the main fuel control 12.

The hollow shaft 64 may be rotated by means of the transmission line 18 which is connected to the gear box 16 driven by the engine. A typical centrifugal speed sensor 66 rotatable with the shaft 64 includes a cross member 67 which is formed to provide an orifice 76 defined by a seat 78 and which contains a valve 70, the latter being urged by $P_1$ pressure toward a full open position that is limited by the member 68. Thus, fuel under pressure $P_1$, which is a constant pump output pressure, flows from the chamber 74 through the orifice 76 controlled by the valve 70, into the axial passage 79 in the shaft 64 and upwardly into chamber 80. A pressure drop occurs across the orifice 76, and the fuel in the chamber 80 is at a somewhat lower pressure, $P_2$. This intermediate pressure, $P_2$, is maintained by virtue of the fixed restriction 82 in the passage 83 communicating between the chamber 80 and any convenient passage (such as conduit 48) leading back to the inlet side of the pump 40.

As the speed of rotation of the shaft 64 increases, the centrifugal force urging the valve 70 closed against seat 78 also increases, thereby restricting the flow of fuel through the orifice 76. Accordingly, it can be seen that the differential pressure, $P_1$–$P_2$, increases as engine speed increases, the differential varying directly as the square of the engine speed. It is to be understood that various other techniques may be employed to sense engine speed and to provide a pressure signal in accord therewith.

Fuel under pressure $P_2$ is then communicated via a passageway 84 to the chamber 86, while fuel under pressure $P_1$ is communicated via a passageway 88 to a chamber 90. A diaphragm 92, including the usual stiffeners 94, forms a movable wall between the chambers 86 and 90; the diaphragm 92 thus senses the pressure differential, $P_1$–$P_2$, which is indicative of engine speed, as mentioned above.

A spring 98 is confined between the upper stiffener 94 and a spring retainer 100 mounted in the chamber 86, the spring retainer 100 being axially adjustable therein by means of an adjustment screw 102. A servo valve 60 and a valve seat 104 are located between the chamber 90 and another chamber 106, the valve 60 being urged against the seat 104 by means of a spring 108. When the force of the spring 98 on the diaphragm 92 exceeds the opposing forces exerted by the $P_1$–$P_2$ pressure differential in chamber 80 and spring 108, valve 60 opens, permitting fuel under pressure $P_1$ to flow through the orifice 110 and into the chamber 106, the pressure, $P_3$, in chamber 106 being slightly less than pressure $P_1$ due to the pressure drop across the orifice 110. Fuel is then communicated via a passageway 112 from the chamber 106 to a chamber 114, wherein $P_3$ pressure and spring 116 urge the valve 63, which may have a resilient seal ring 118 affixed thereto and which is attached to the diaphragm 120, closed against a seat 122. While the valve 63 is closed, the pressure in the chamber 124 adjacent thereto is essentially atmospheric, hereinafter referred to as $P_a$.

Valve 63 will be closed so long as the speed of rotation of the shaft 64 is less than the above mentioned 10% of maximum engine speed. However, once this 10% speed has been exceeded, pressure $P_2$ in chambers 80 and 86 will have decreased, permitting the pressure $P_1$ in the chamber 90 to raise the diaphragm 92 from the valve 60 against the force of the spring 98. This allows the spring 108 to close the valve 60 against the seat 104 in opposition to the pressure differential, $P_1$–$P_3$, thereby blocking off the flow from the chamber 90 to the chamber 106.

As soon as flow into the chamber 106 stops, pressure $P_3$ decreases to approximately the value of pump return pressure, $P_4$, by virtue of the flow through a passageway 126 and the restriction 128 from the chamber 106 to the inlet of the pump 40 via the passageway 48. It is evident that when pressure $P_3$ diminishes a predetermined amount, $P_1$, which acts only on the outer portion of the diaphragm 120, will overcome the spring 116 and raise the valve 63, admitting $P_1$ fuel to chamber 124. The fuel displaced from the chamber 114 merely flows to the chamber 106 via the passageway 112, and thence to the pump return conduit 48 via the passageway 126 and the restriction 128.

A passageway 130 is in constant communication between the chamber 124 and an upper chamber 132. The igniter valve 62 is urged toward a valve seat 134 formed in the orifice 136 between the chambers 132 and 138 by a spring 140 confined within the chamber 138. A passageway 142 communicates between the chamber 138 and the conduit 56. A diaphragm 144 including the usual stiffeners 146 forms a movable wall between the chamber 132 and a chamber 148. An opening 150 including a restriction 152 communicates between the chamber 148 and the speed sense chamber 80. The slave valve 61 is urged toward a valve seat 154 formed in an orifice 156 between the chambers 114 and 148 by a spring 158, the latter being confined by a spring retainer 160 formed within the chamber 114. A spring 162 mounted in the chamber 148 urges the diaphragm stiffener 146 upwardly away from the valve 61 and toward the valve 62.

Before valve 63 opens, the pressure in chamber 132 is substantially atmospheric, as previously stated. The pressure in chamber 148 is equal to $P_2$ so long as chamber 148 is dead-ended by virtue of the valve 61 being closed. Hence, the pressure differential across the diaphragm 144 is a function of speed. The $P_2$–$P_a$ pressure differential and the force of spring 162 acting on diaphragm 144 maintain the valve 62 open against the force of the spring 140 tending to close it. When valve 63 opens, fuel under pressure $P_1$ will also be admitted to the chamber 132 via the passage 130. While the valve 62 is raised from its seat 134, the fuel will flow from the chamber 132, through the orifice 136, into chamber 138 and thence to the igniter 54 through the passageway 142 and the conduit 56. The force of the spring 162 in chamber 148 is sufficient to resist any downward movement of the diaphragm 144 until such time as the pressure differential $P_1$–$P_2$ is indicative of an engine speed at which it is desired to cut off the igniter fuel, 40% of maximum engine speed, for example. When $P_2$ has dropped to the above value due to increasing engine speed, $P_1$ acting on the diaphragm 144 will force it downwardly against the force of the spring 162, permitting spring 140 to close valve 62. This, of course, cuts off the flow of fuel to igniter 54.

A moment or so later, depending upon the amount of physical gap between valves 61 and 62 as compared to the thickness of the diaphragm 144 and its stiffeners 146, the diaphragm 144 will contact the valve 61 and move it downwardly against the force of the spring 158. Communication is now complete between the chambers 114 and 148, causing the pressure in the chamber 148 to approach $P_3$. So long as the upperside of the diaphragm 144 is subjected to $P_1$ pressure, the valve 61 will remain open and the valve 62 closed.

During the "shut-down" operation, the $P_2$ pressure in the chamber 80 will bleed through the restriction 152 into the chamber 148. This pressure will dump through the orifice 156 past the valve 61 into the chamber 114 and thence to the inlet side of the pump 40 via passageways 112, 126 and 48 as long as the valve 61 is held open by the diaphragm 144.

As the engine speed continues to decrease, $P_2$ pressure in the chambers 80 and 86 will have increased to a point where the pressure differential $P_1$–$P_2$ across the diaphragm 92 has decreased sufficiently for the spring 98 to force the diaphragm 92 and its stiffeners 94 downwardly against servo valve 60. This opens the valve 60 against the force of the relatively small spring 108, thereby permitting $P_1$ pressure to enter the chamber 106 from the chamber 90 in the passageway 88 and subjecting the chamber 114 to $P_1$ pressure via the passage 112. The pressure $P_1$ against diaphragm 120 is sufficient to force it downwardly, thereby closing the slave valve 63. This could be made to occur at 10% of maximum engine speed, for example.

As soon as the valve 63 closes, the pressure in the chamber 124, and hence in the chamber 130, will drop from $P_1$ to $P_a$. This reduction in pressure above the diaphragm 144 will permit the spring 162 in the chamber 148 to raise the diaphragm 144, thereby directly raising the igniter valve 62 against the force of the spring 140 and further permitting the spring 158 to raise and close the check valve 61. Closing the check valve 61 will once again dead-end the chamber 148, thereby allowing the pressure therein to equal $P_2$ via the restriction 152, in preparation for the next cycle.

From the above discussion, it is apparent that the servo valve 60 would be open during cranking from 0% to 10% of maximum engine speed and during engine "shut-down" from 10% to 0%. Accordingly, the slave valve 63 is open while speed is increasing from 10% to 100% of maximum engine speed, and during "shut-down" from 100% to 10% of maximum engine speed. It is equally apparent that the igniter valve is open during cranking from 0% to 40% of maximum engine speed, but it will be noted that no igniter fuel is able to flow past the valve 62 until after the slave valve 63 has opened at approximately 10% of maximum engine speed. During the "shut-down" process, the igniter valve 62 opens at the 10% level, at which time the check valve 61 closes.

It is apparent that the engine speeds at which the above described igniter action takes place may be varied from the example of 10 to 40 percent of maximum engine speed. Actually, any speed values can be predetermined for specific engine requirements, merely by varying the design details, such as spring forces, diaphragm diameters, etc.

Looking now at the over-all operation, it will be noted that in the arrangement shown by FIGURE 2, the device controlling the supply of fuel to the igniter also controls the flow of fuel to the main fuel metering device. In other words, in this arrangement the engine would be cranked, during which time any residual fuel would be exhausted from the engine, and when cranking resulted in engine shaft speed approximately 10% of the maximum engine speed, fuel would be supplied both to the igniter and to the metering section of the main fuel control. The ignition system would be actuated at this time, and the igniter would produce a smaller flame that ignites the main burners. Main fuel and igniter fuel would continue to be supplied after the engine started and became self-sustaining until its speed reached approximately 40% of maximum, at which time the igniter fuel would be shut off but the main fuel would continue to be supplied. Igniter fuel is not supplied during the 40% to 10% speed range on shut down of the engine as it was in the 10% to 40% range when the engine was started, and main fuel is cut off when engine speed drops to 10%.

From the above discussion, it is apparent that the invention provides a compact and efficient igniter fuel device having a number of novel features that result in accurate sequencing of fuel flow to the igniter of a gas turbine engine during the starting process and the prevention of said flow to the igniter during the "shut-down" process. Also, the servoed starting device may be incorporated in series with the main fuel control unit, either downstream or upstream thereof, as well as in the fuel control housing itself as an integral part thereof.

The use of the device disclosed herein is not limited to aircraft type gas turbine engines, or even to the control of gas turbine engines generally. For example, the device may be employed in any installation in which it is desired to control fluid flow in accordance with changes in some parameter reflected in variations in an input pressure, as might be the case in some stationary chemical processing installation.

Although but one embodiment of the invention is shown and described for purposes of illustration, it is apparent that other modifications thereof may be possible within the scope of the appended claims.

What I claim as my invention is:

1. Apparatus for starting the flow of fuel to the burner section of a gas turbine engine and for sequentially starting and stopping the flow of fuel to the igniter section thereof, said apparatus comprising three pairs of chambers, each pair of chambers having pressure responsive means forming a movable wall therebetween, a conduitry system operatively connecting said three pairs of chambers, single valve means associated with two of said pressure responsive means and with said conduitry system, double valve means associated with said third pressure responsive means and with said conduitry system, said two single valves being arranged to open and close alternatively upon attainment of some predetermined pressure differential across one of said pressure responsive means and the two valves of said double valve means being arranged to open and close alternatively upon attainment of some higher predetermined pressure differential across their associated pressure responsive means.

2. Apparatus for starting the flow of fuel to the burner section of a gas turbine engine and for sequentially starting and stopping the flow of fuel to the igniter section thereof, said apparatus comprising three pairs of chambers, each pair of chambers having pressure responsive means forming a movable wall therebetween, a conduitry system operatively connecting said three pairs of chambers, single valve means associated with two of said pressure responsive means and with said conduitry system, double valve means associated with said third pressure responsive means and with said conduitry system, said two single valves being arranged to open and close alternatively upon attainment of some predetermined pressure differential across one of said pressure responsive means and the two valves of said double valve means being arranged to open and close alternatively upon attainment of some higher predetermined pressure differential across their associated pressure responsive means while said pressure differential is increasing, said two valves reversing upon attainment of said first mentioned predetermined pressure differential while said pressure differential is decreasing.

3. In a fuel control for a gas turbine engine including burner and igniter sections, said control including an inlet from a costant pressure fuel supply source, a speed sensing means for producing a hydraulic pressure, the differential between said last mentioned pressure and said source pressure being indicative of engine speed, a first passage leading to the burner section of said engine and a second passage leading to the igniter section of said engine, a starting fuel device, said device comprising a servo valve arranged to close in response to a first predetermined valve of said pressure differential, a slave valve for allowing communication between said inlet and said pair of passages upon the closing of said servo valve, an igniter fuel valve arranged to block off flow through said second passage in response to a predetermined higher valve of said pressure differential and to remain closed until said first predetermined pressure differential is once again attained, and a check valve adjacent said igniter valve and arranged to open in response to said predetermined higher valve of said pressure differential and to remain open until said first predetermined valve of said pressure differential is once again attained, thereby preventing said igniter valve from opening while said pressure differentials are decreasing from said predetermined higher value to said first predetermined value.

4. A device for controlling the flow of fluid from a constant pressure source to separate first and second points in a fluid consuming mechanism having an operating parameter, said device comprising a main conduit extending from said constant pressure source and branching into separate conduits leading to said first and second points, means for continuously sensing said parameter and causing a pressure varying from said constant pressure in accordance with said sensed parameter, servo valve means responsive to the pressure differential between said constant pressure and said variable pressure for providing a pressure signal indicative of said parameter, slave valve means in said main conduit responsive to said pressure signal for controlling the flow of said constant pressure fluid through said main conduit at some preselected range of said parameter, means in one of said branch conduits initially responsive to said pressure differential for preventing fluid flow through said branch conduits during some other preselected range of said parameter and additional means for eliminating said variable pressure from influencing said last mentioned means during said other preselected range of said parameter.

5. A device for controlling the flow of fluid from a constant pressure source to separate first and second points in a fluid consuming mechanism having an operating parameter, said device comprising a main conduit extending from said constant pressure source and branching into separate conduits leading to said first and second points, first means for continuously sensing said parameter and causing a pressure varying from said constant pressure in accordance with said sensed parameter, second means responsive to the pressure differential between said constant pressure and said variable pressure for providing a pressure signal indicative of said parameter, third means in said main conduit responsive to said pressure signal for controlling the flow of said constant pressure fluid through said main conduit at some preselected range of said parameter, fourth means in one of said branch conduits initially responsive to said pressure differential for preventing fluid flow through said branch conduits during some other preselected range of said parameter and fifth means for eliminating said variable pressure from influencing said fourth means during said other preselected range of said parameter.

6. In a fuel control for a gas turbine engine including burner and igniter sections, said control having an inlet from a constant pressure fuel supply source, a hydraulic speed sensing means for controlling fuel flow from said inlet to a chamber downstream thereof, a first outlet to the burner section of said engine, a first passageway communicating between said outlet and the igniter section of said engine and a spring-loaded igniter valve in said first passageway for at times shutting off the flow therethrough, a starting fuel system, said system comprising first and second chambers, a first diaphragm forming a movable wall between said first and second chambers, a third chamber having a spring-loaded servo valve therein for controlling communication between said second and third chambers, said servo valve at times being in contact with said first diaphragm, a second passageway communicating between said downstream chamber and said first chamber, a third passageway communicating between said inlet and said second chamber, fourth and fifth chambers, a second diaphragm forming a movable wall between said fourth and fifth chambers, a fourth passageway communicating between said inlet and said fourth chamber, said second diaphragm at times permitting communication between said fourth chamber and said outlet, a fifth passageway communicating between said third chamber and said fifth chamber, a sixth passageway having a fixed restriction therein communicating between said third chamber and the inlet side of said fuel supply source, a sixth chamber, a third diaphragm forming a movable wall between said sixth chamber and said first passageway and being operable at times to open said igniter valve, a seventh passageway communicating between said sixth chamber and said downstream chamber, a restriction in said seventh passageway and a spring-loaded check valve located between said fourth and sixth chambers for permitting communication therebetween upon being opened by said third diaphragm.

References Cited by the Examiner

UNITED STATES PATENTS

| 3,173,468 | 3/1965 | McCombs | 60—39.28 X |
| 3,194,252 | 7/1965 | Locher et al. | 137—34 X |

JULIUS E. WEST, *Primary Examiner.*